Nov. 4, 1952     F. SPRAGUE ET AL     2,616,400
POSITIONING DEVICE FOR WINDSHIELD WIPERS
Filed Oct. 17, 1949                    2 SHEETS—SHEET 1

FRANK SPRAGUE AND
ELTON F. NICHOLS.
INVENTORS.

BY Oltsch & Knoblock
ATTORNEYS

Patented Nov. 4, 1952

2,616,400

UNITED STATES PATENT OFFICE 2,616,400

POSITIONING DEVICE FOR WINDSHIELD WIPERS

Frank Sprague and Elton F. Nichols, Michigan City, Ind., assignors to Sprague Devices, Inc., Michigan City, Ind., a corporation of Indiana Application October 17, 1949, Serial No. 121,843

10 Claims. (Cl. 121—164)

This invention relates to positioning devices for fluid actuated motors, and more particularly to positioning means for windshield wiper motors characterized by mechanically actuated reversing means.

Windshield wiper motors of the type actuated by air under pressure above atmospheric pressure, now commonly manufactured and supplied for use on trucks, busses and other large vehicles, frequently lack means by which the windshield wiper blade may be positioned at an end of its stroke when not operating. Consequently, it is necessary for the operator to actuate the control valve at such a time that the wiper blade will be caused to stop at one end of its stroke if he is to avoid obstruction to his vision by the wiper blade. Windshield wiper motors adapted for this service are usually constructed to produce much more power than ordinary automobile windshield wiper motors so as to enable a large windshield wiper blade to be operated thereby. In other words, the load to which a windshield wiper used upon a truck or bus is customarily subjected is greater than that to which the ordinary automotive windshield wiper is subjected, and the parts of the device must be constructed of sufficient size, weight and strength to permit the application of the power required. The size, power output, and the weight of these windshield wiper motors render the usual methods of positioning windshield wiper blades, as applied to the motor of a small automotive windshield wiper, ineffectual.

It is the primary object of this invention to provide a novel means by which a reciprocating fluid pressure motor can be positioned automatically at the end of a stroke after the motor has been deenergized.

A further object is to provide a fluid pressure network associated with the intake and outlet ports of a fluid pressure actuated motor and including means for applying fluid under pressure to the inlet port of the motor when the actuating valve is opened, and for applying fluid pressure to the outlet port of the motor for the purpose of positioning the motor when the actuating valve is closed.

A further object is to provide a windshield wiper motor of the fluid actuated type with a fluid pressure network including a differential area valve so connected in said network as to be subject to control by a manually actuated valve, for the purpose of varying the path of flow of pressure in said network and said windshield wiper motor as the operating position of said manual valve is varied.

Other objects will be apparent from the following specification.

Figure 2:
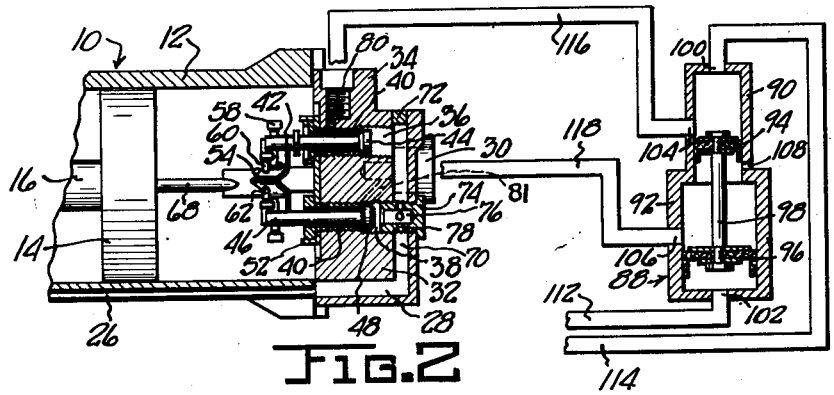
Fig. 2 is a fragmentary sectional view illustrating a fluid pressure motor and a control valve in cross-section and illustrating diagrammatically the fluid pressure connections, said valve and said motor being illustrated in one operative position.

Referring to the drawings which illustrate one embodiment of the invention as applied to the motor of a windshield wiper, the numeral 10 designates a fluid pressure motor which preferably has an elongated cylindrical casing 12 within which reciprocates a pressure responsive unit which includes pistons 14, of which one only is illustrated herein at Fig. 2, said pistons being interconnected by a longitudinal shaft or rod 16. The cylinder 12 has associated therewith a shaft mounting unit 18 which preferably includes a sleeve or socket 20 adapted to receive a shaft (not shown) upon which a windshield wiper blade (not shown) is to be mounted. The sleeve 20 has a suitable operating connection (not shown) with the pressure responsive piston unit so as to be oscillated or rocked incident to the oscillation or reciprocation of the piston unit within the cylinder. The construction of these parts is well understood in the art and, therefore, the specific mechanism employed to establish the driving connection between the parts 16 and 20 has not been illustrated herein.

Figure 3:
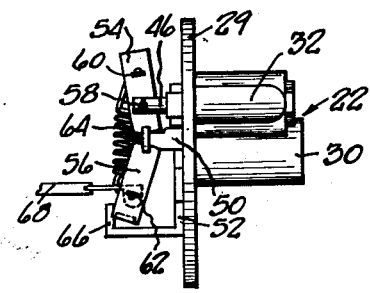
Fig. 3 is a detail edge view of a valve actuating mechanism.

A control valve unit 22 of the character illustrated in Fig. 3 is suitably secured or mounted upon one end of the cylinder 10, and the other end of the cylinder 10 is spanned and sealed by an end plate 24. The valve unit 22 may be of any construction found suitable for use in reversing the direction of flow of fluid under pressure within the fluid pressure motor, being constructed to respond to the position of the piston unit 14, 16. In this connection the cylinder 12 is preferably provided with a longitudinal passage 26 open at one end to a passage 28 in the valve 22, as illustrated in Fig. 2, and communicating with the left-hand end of the cylinder, as viewed in Fig. 1, at its opposite end. The purpose of the valve is to control the flow of air through the fluid pressure motor so that it is periodically reversed. The valve, in one operative position, applies a high working pressure to one end of the motor, as at the right in Fig. 2, whereby the left-hand end of the cylinder is vented for the passage of fluid under low pressure through the passages 26 and 28 and associated parts. In its opposite position the direction of flow is reversed, and the high pressure is applied through the ports 26 and 28 to the left-hand end of the cylinder.

It will be understood that valves of various types and constructions can be employed which will perform this service, and the embodiment which we have chosen to illustrate herein has a plate portion 29 by which it is mounted or secured to the end of cylinder 10 and has projecting outwardly therefrom a plurality of projections, including a tubular internally threaded socket portion 30 and a transverse rib portion 32 which terminates at one end in an internally screw-threaded socket portion 34.

The rib 32 has two parallel spaced bores 36 and 38 formed therein to extend substantially parallel to the axis of the cylinder 12. The bore 36 is open at the inner end of the valve housing but closed at its outer end, and the bore 38 is open at both ends. The bores 36 and 38 are both preferably screw-threaded, and each mounts therein for a portion of its length a screw-threaded sleeve 40 extending substantially from the inner face of the valve to a point substantially midlength of its mounting bore. A valve plunger 42 is slidable in and has clearance in the sleeve 40 and the bore 36, and has an enlarged head 44 at its outer end adapted to bear against the end of the sleve 40. The valve plunger 46 is slidable in and has clearance in the sleeve 40 lining the passage 38, and has an enlarged head 48 at its outer end adapted to seat against the outer end of the sleeve 40.

The plungers 42 and 46 are preferably interconnected by a toggle mechanism to cause simultaneous operation thereof. One form of such toggle mechanism is illustrated in Fig. 3, wherein ears 50 project from a bracket 52 secured to the inner face of a plate portion 29 of the valve body, and said ears provide fulcrum points against which the inner ends of toggle arms 54 and 56 engage. As best seen in Fig. 2, the toggle arm 54 is substantially V-shaped, with the opposite sides of the V thereof extending adjacent to and between but clear of the valve plungers 42 and 46. A cross-pin 58 is carried by the toggle arm 54 and extends through transverse apertures in the ends of the plungers 42 and 46. Consequently, swinging of the toggle member 54 simultaneously shifts the two valve plungers in the same direction. If desired, the portion of the toggle arm 54 adjacent to the valve plunger 42 may have a larger opening therein for the reception of the pin 58 than does its opposite end, so that certain free play is provided and the stroke of the valve plunger 42 is less than the stroke of the valve plunger 46.

The toggle arm 54 mounts a cross-pin 60, and the toggle arm 56 mounts a cross-pin 62, and these cross-pins are interconnected by a coil spring 64 which serves to shift the toggle arms 54, 56 to opposed limit positions whenever the same are off center. The brackets 50 are short so that the free ends of the toggle arms 54 and 56 may engage the face of the valve plate 29 or the bracket 52 in one operative position of the toggle, and the bracket 52 includes a projecting stop portion 66 which may be engaged by the toggle arm 56 to define the opposite limit position of the toggle. In the latter connection it will be apparent that the heads 44, 48 of the valve plungers 42 and 46 would also serve to normally stop the toggle in the position illustrated in Fig. 3. A rigid link 68 projecting from the outer face of the piston 14 is provided with a terminal portion pivotally connected to the toggle unit, as at the pin 62, and serves as the means for actuating the toggle as the piston unit reaches opposite ends of its stroke. For this purpose the connection (not shown) between the part 68 and the piston preferably provides for free play so that the movement of the piston unit is transmitted to the toggle only at the free ends of the movement of the piston unit.

The body parts 30, 32 and 34 of the valve mechanism are provided with a plurality of passages and ports. Thus the passage 28 is formed in one end of the rib 32 communicating with the tube 26, and in turn, it communicates with a transverse passage 70 which intersects the bore 38 and communicates with the outer end of the bore 36. The passage 70 is closed at its end by means of a plug 72. A plug member 74 is threaded in the bore 38 extending across the passage 70 and sealing bore 38. Within this plug is a bore 76 which is adopted to be sealed by the head 48 of valve plunger 46 when that plunger is in the position illustrated in Figs. 4 and 6. A transverse bore 78 communicates with the bore 70 and permits communication between the ends of the bore 70 at opposite sides of plug 74. The internally screw-threaded socket portion 34 of the valve unit has a port 80 formed therein and a similar port is formed in register therewith in the valve sleeve 40 within which the valve stem 42 is received. The bore of internally screw-threaded socket portion 30 has communicating therewith a passage 81 which communicates with the bore 38 at a point between the plug 74 and the sleeve 40.

A fluid pressure network communicates with the windshield wiper motor and includes an air pump or other source of fluid pressure 84, a manually actuated valve 86 and a differential area plunger or piston type valve 88. The valve 88 has a housing formed in part from a small diameter cylinder portion 90 and in part from a cylindrical portion 92 of larger diameter than the portion 90 and with its axis parallel to the axis of the portion 90 and preferably aligned therewith. A piston 94 is slidable longitudinally in the housing portion 90, and a piston 96 is slidable in the piston portion 92, and a rigid stem or rod 98 connects the two pistons 94 and 96 in fixed relation, one to another. The small diameter portion 90 of the valve housing has a port 100 formed in the outer end wall thereof, and the large diameter portion of the cylinder housing has a port 102 formed in the end thereof. A port 104 is formed in the small diameter housing portion 90 spaced from the end wall thereof a distance greater than the axial dimension of the piston 94. A port 106 is formed in the large diameter cylinder portion thereof a distance spaced from its end wall greater than the axial dimension of the piston 96. Between the two ports 104 and 106 is positioned a vent port 108, here illustrated as formed in the small diameter housing portion 90, and spaced from the port 104 a distance greater than the axial dimension of the piston 94.

A conduit 110 connects the source of fluid pressure 84 to the manual control valve 86. A conduit 112 connects the valve 86 with the port 102. A conduit 114 connects the source of fluid pressure 84 with the valve port 100. A conduit 116 connects the port 104 of the valve 88 with the socket 34 of the motor valve, and a conduit 118 connects the port 106 with the valve socket 30.

Figure 1:
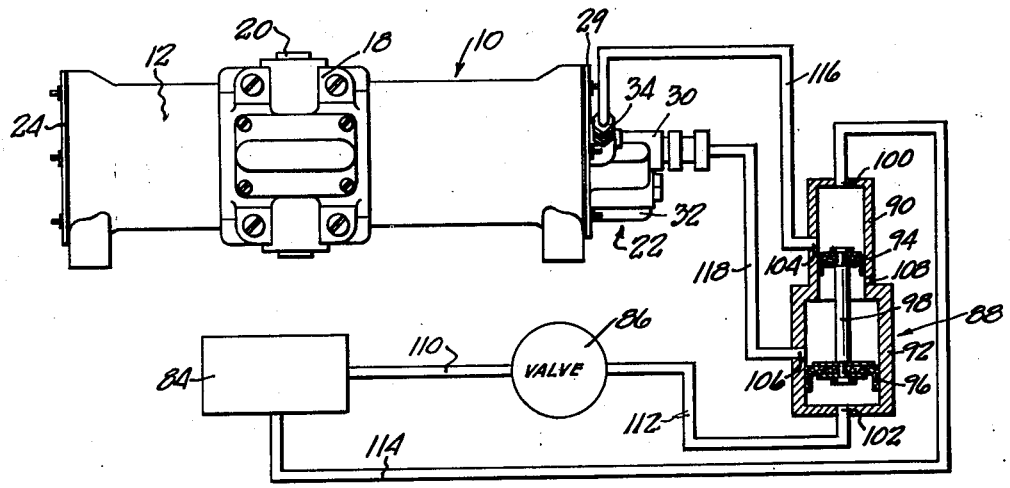
Fig. 1 is a side view of a windshield wiper motor and a control valve therefor, together with a diagrammatic illustration of the fluid network system interconnecting said parts, said valve being illustrated in section.
Figure 4:
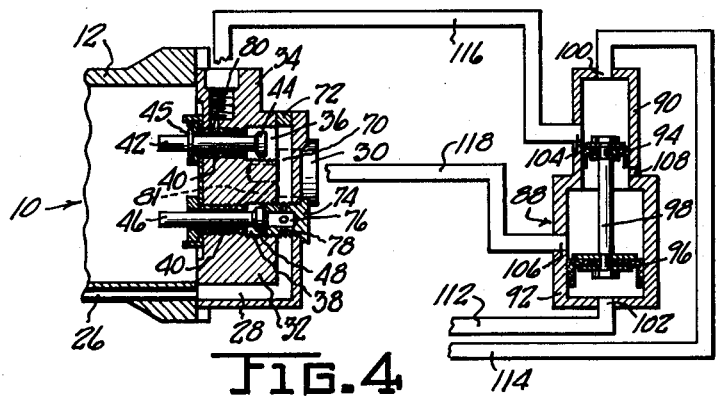
Fig. 4 is a view similar to Fig. 2, illustrating the parts in a different operative position.
Figure 5:
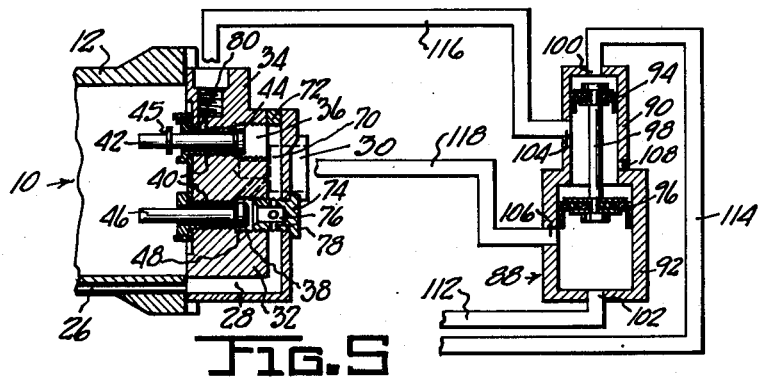
Fig. 5 is a view similar to Fig. 2, but illustrating the parts in another operative position.
Figure 6:
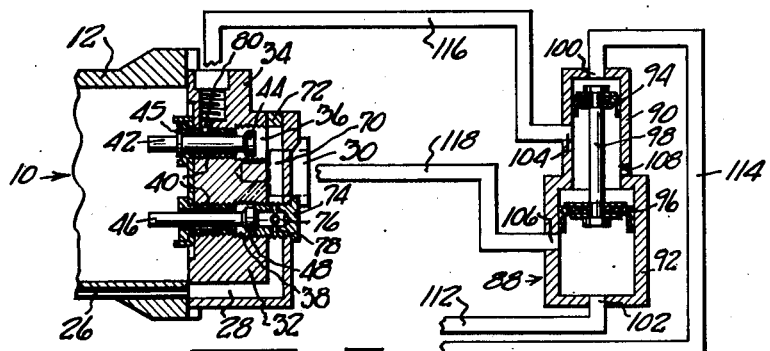
Fig. 6 is a view similar to Fig. 2, but illustrating the parts in another operative position.

The operation and functioning of the device in different operative positions and conditions is illustrated in the drawing. Fig. 1 illustrates the position of the valve 88 when the manual control valve 86 is closed. Fig. 2 illustrates the same condition but shows the position of the parts with the piston unit 14, 16 moving toward the left, or at their left limit of movement. Fig. 4 illustrates the relation of the parts when the valve 86 is closed and the piston unit is moved toward the end of its stroke at the right. Fig. 5 discloses the arrangement of the parts when the valve 86 is open and the piston unit of the fluid pressure motor is moving toward the right; and Fig. 6 illustrates the relation of the parts when the valve 86 is open and the piston unit of the fluid pressure motor is moving toward the left.

In the position of the parts illustrated in Fig. 2, fluid under pressure from the pressure source 84 is applied to the valve 86 through the line 110, but said valve is closed so that no fluid flows through the line 112. Fluid from the pressure source 84 also passes through conduit 114 and this fluid enters the port 100 and acts upon the small piston 94, thus displacing the piston unit 94, 96, 98 to the lowered position illustrated, thereby opening the port 104 into communication with the portion of the valve housing with which the port 100 communicates. The fluid under pressure thus flows from port 100 through valve housing 90 to port 104 and through the conduit 116 to the motor valve bore 80, through which it passes into the interior of the sleeve 40 in which the valve plunger 42 is positioned. The head 44 seals the right-hand end of said sleeve but the fluid under pressure passes through the sleeve around the valve plunger to enter the right-hand end of the cylinder 12 and thus act upon the piston 14 in a manner to urge the same to the left. The fluid which exists in the opposite end of the cylinder 12 is displaced therefrom by the piston and discharged through the passages 26, 27 and 70, and thence enters the transverse bore 78 and longitudinal bore 76 of the plug 74, whereupon it passes into the bore 38 and into the bore 81 which communicates with the bore of the socket portion 30. The fluid is discharged from the socket 30 through the conduit 118, the port 106, the valve housing 88 between the two pistons and is discharged through the vent port 108. In this connection the movement of the piston 14 is in such direction that, when the piston unit reaches the end of its stroke toward the left, the continued application of pressure will serve merely to hold the piston unit in that position. Consequently, the windshield wiper mounted in the carrier 20 will be held by the applied fluid under pressure in the Fig. 2 position of the parts at the left-hand end of its stroke. This position of the parts will occur when the valve 86 is closed during the time the piston unit 14 is moved from the left to right and before the valve unit has thrown the toggle over center to move the valve plungers 42, 46 to the Fig. 4 position.

In the event the valve 86 is closed while the piston unit 14, 16 is moved from the right to the left, that is, closed after the toggle mechanism has been thrown from the position illustrated in Figs. 2 and 3 to its opposite position, the parts will be arranged as shown in Fig. 4. In that instance flow from the source of pressure 84 will be through the conduit 114, port 100, valve housing 90, port 104, conduit 116, port 80 and out of the right-hand end of the sleeve 40 into the bore 36. In this connection it will be observed that the valve plunger 42 mounts a seal 45 which is now engaging the inner end of the sleeve 40 and preventing the flow of air or fluid under pressure through the sleeve 40 directly into the right-hand end of the cylinder 12. The fluid under pressures passes from bore 36 into bore 70 and through the transverse port 78 in the plug 74 whose longitudinal bore 76 is now sealed by the head 48 of the valve plunger 46. After passing through the transverse bore 78 of the plug 74 the fluid under pressure continues through bore 70 to passage 28 and passage 26 to the left-hand end of the cylinder 12 where it acts upon the piston cylinder unit 14, 16 to move the same toward the right. Fluid in the right-hand end of the cylinder 14, that is, to the right of piston 14 is displaced from that cylinder through the sleeve 40 around the valve plunger 46 and into the bore 38, and thence through the transverse passage 81 into the bore of the socket 30 and through the conduit 118, the port 106, the valve body between the two valve pistons 94 and 96 for exhaust at the vent 108. Thus Fig. 4 illustrates the position which the parts assume with the windshield wiper blade held at the end of its stroke at the right.

When the valve 86 is opened after the parts are in the position illustrated in Fig. 2, the device assumes the position illustrated in Fig. 5. The fluid under pressure in this instance is acting through both of the lines 112 and 114. However, since the area of the piston 96 is greater than the area of the piston 94, the piston unit 94, 96, 98 is moved away from the port 102 and toward the port 100, thence assuming the position illustrated in Fig. 5 with the piston 96 positioned between the ports 106 and 108, and the piston 94 positioned between the ports 100 and 104. Consequently, fluid under pressure passes from the source 84, the conduit 110, the valve 86, the conduit 112, the port 102, into the large diameter end of the valve 88, from which it is exhausted through the port 106 for discharge through the conduit 118 into the socket 30 of the motor valve from which it passes through the transverse bore 81 into the bore 38. The fluid thence passes into the bore 76 of the plug 74 and is discharged therefrom through the port 78 for passage through the ports 70 and 28 into and through the passage 26 for discharge into the cylinder at the left-hand end thereof, thereby causing the piston unit 14, 16 to move toward the right. The fluid at the right-hand end of the cylinder is displaced through the sleeve 40 around the valve plunger 42, the bore 80, the line 116, the small diameter end 90 of the valve 88 and out through the vent port 108.

When the piston unit 14, 16 approaches the end of its stroke toward the right, it causes the connector part 68 to shift the toggle from the position illustrated in Figs. 2 and 3 to the reverse position with the free or outer ends of the toggle parts 54 and 62 oppositely disposed with respect to the angular position illustrated in Fig. 3. The throw of the toggle to this position causes the valve plungers 42 and 46 to be shifted from the position illustrated in Fig. 5 to the position illustrated in Fig. 6. When the valve plunger is in the Fig. 6 position, the flow in the system occurs from source 84 through conduit 110, valve 86, conduit 112, port 102, the chamber 92 of valve 88, the port 106, conduit 118, socket 30, into the bore 38, thence through the sleeve 40 around the stem 46 into the right-hand end of the cylinder 12. Fluid at the left-hand end of the cylindex is then displaced through the passages 26, 28, 70, the transverse bore 78 of plug 74, into the upper portion of passage 70 and thence into and through the bore 36, the sleeve 40 around the valve plunger 42, the bore 80, the conduit 116, the valve chamber 90 and the vent port 108. The setting continues until the piston unit 14, 16 approaches the end of its stroke to the left, whereupon the toggle is again actuated by the elements 68 and shifted back to the position shown in Fig. 3 and in Fig. 5.

It will be seen, therefore, that this invention entails the connection of a fluid pressure network or system with a fluid pressure motor of the type having a mechanically actuated reversing valve in such a manner that the normal intake port of that fluid pressure motor, namely, the port 30, constitutes the intake port only during such time as the fluid pressure motor is operating. When the fluid pressure motor is not operating, fluid is supplied to the device through the port thereof which normally constitutes its outlet port, and enters the device to displace the piston or other pressure responsive member toward that end of its stroke from which it previously was shifted. Stated differently, when the manual control valve is closed, the fluid pressure is nevertheless admitted to the system and the motor through the normal outlet port of the motor in a manner to shift the pressure responsive oscillatable unit toward that end of its stroke which is ineffective to actuate the mechanical reversing valve. That fluid pressure continues to be supplied at all times that the source 84 is energized. Since the source 84 commonly constitutes a pump which is driven by the engine of the vehicle whenever the vehicle engine operates, in the case of a windshield wiper, then, whenever the vehicle is operating, the fluid pressure will be effective either to position the windshield wiper blade at the end of its stroke or to oscillate the windshield wiper blade, depending upon the setting of the control valve 86. It will be obvious that, if the vehicle engine is not operating, the vehicle will not ordinarily be moving and the need for avoidance of interference with the vision of the operator does not exist, so that the positioning of the wiper blade is not critical. As soon, however, as the vehicle does move, assuming that the wiper blade should be displaced to a position interfering with the driver's vision, while the engine of the vehicle is not operating, the pressure from the pressure source will restore the blade to its "parked" or inoperative position.

It will be apparent also that the application of the invention is not limited to fluid pressure motors having mechanically actuated valves of the specific construction illustrated herein, but may be used in conjunction with a motor having any type of mechanical reversing valve.

While the preferred embodiment of the invention has been illustrated and described herein, it will be understood that changes may be made in construction within the scope of the appended claims without departing from the spirit of the invention.

We claim:

1. The combination with a fluid actuated motor having an oscillatable member responsive to fluid pressure and a reversing valve mechanically actuated by said member, and a source of fluid pressure, of a fluid pressure system connecting and interposed between said source and motor and including a manual control valve and a second reversing valve responsive to fluid pressure in said system as regulated by said control valve, said last named valve directing fluid from said source in one single flow path to said motor when said manual valve is closed and in a different single flow path to said motor when said manual valve is open.

2. The combination defined in claim 1, wherein said last named valve is a differential area valve having a small area portion connected directly to said pressure source and a large area portion connected to a network portion leading to said source and including said manual control valve.

3. In combination, a pressure responsive motor having a chambered housing with inlet and outlet ports, a pressure responsive element oscillatable in said housing, and a reversing valve carried by said housing and positioned by said oscillating element; a source of fluid under pressure; a manual control valve; a differential area reversing valve; and a plurality of conduits connecting said motor, control valve and differential valve to define a fluid pressure network in which fluid under pressure continuously flows through said differential valve when said source is operative, the large area portion of said differential valve and said control valve both being interposed in a network portion connecting said pressure source to said motor inlet port to normally direct fluid under pressure to said inlet port, the small area portion of said differential valve being interposed in a network portion connecting said pressure source to said motor outlet port to direct fluid under pressure to said outlet port when said control valve is closed.

4. The construction defined in claim 3, wherein said differential valve has an exhaust vent communicating with one of said network portions as determined by the setting of said control valve.

5. In combination, a fluid pressure motor having a chambered housing and inlet and outlet ports, said motor including a pressure responsive oscillating element and a reversing valve positioned by said element, a fluid pressure network including a pair of conduit lines communicating with said inlet and outlet ports respectively, a fluid pressure source connected to discharge into both conduit lines, a manual control valve interposed in one line, and a differential area valve having a large area portion interposed in the line in which said control valve is connected, and a small area portion interposed in the other line said large area portion being connected to and directing fluid flow to said outlet port when said control valve is open, said small area portion being connected to and directing fluid flow to said port when said control valve is closed.

6. The combination defined in claim 5, wherein said differential area valve includes a vent port and a pressure responsive valve unit shiftable to close the portion of one of said lines which is connected to said source and to open the remainder of said line into communication with said vent port.

7. In combination, a pressure responsive windshield wiper motor having an inlet and an outlet, a source of fluid pressure, a manual control valve, a plurality of conduits connecting said motor and pressure source to define a network having legs connected respectively with said inlet and outlet ports, said control valve being connected in one of said legs, a reversing valve connected in both network legs and including a vent and being of the differential area type having its large area portion communicating with the network leg which includes said control valve, said last named valve selectively controlling flow from said source to said motor through one leg only and from said motor to said vent through the other leg.

8. Means for positioning at the end of its stroke when inoperative, the oscillating element of a pressure responsive reciprocating motor having inlet and outlet ports, comprising a differential area valve, a source of fluid pressure, a manual control valve, a conduit line connecting said source to said motor inlet and having said control valve and a large area portion of said differential valve connected therein to control flow therein, and a second conduit line connecting said source to said motor outlet and having a small area portion of said differential valve connected therein to control flow therein.

9. A device as defined in claim 8, wherein said differential area valve includes a pressure responsive element controlling both lines to selectively close one and open the other, said differential area valve having a vent communicating with said closed line.

10. A device as defined in claim 8, wherein said differential area valve comprises a housing having two communicating chambers of different cross-sectional sizes, a large piston, a small piston, means fixedly connecting said pistons to form a unit having a stroke greater than the axial dimensions of said pistons, each chamber having a port at its outer end communicating with the portion of a line leading to said pressure source and a port intermediate its length and at a midpoint of the stroke of the associated piston, and a vent port in said housing positioned between the inner ends of the strokes of both pistons.

FRANK SPRAGUE.
ELTON F. NICHOLS.

REFERENCES CITED

The following references are of record in the file of this patent:

UNITED STATES PATENTS

| Number | Name | Date |
|---|---|---|
| 1,363,333 | Lower | Dec. 28, 1920 |
| 1,674,056 | Oishei et al. | June 19, 1928 |
| 2,310,750 | Schnell | Feb. 9, 1943 |
| 2,516,558 | Freedman et al. | July 25, 1950 |